April 26, 1960     E. J. GREENAWALT     2,934,358
TRACTOR-TRAILER FIFTH WHEEL COUPLER Filed Jan. 16, 1959     4 Sheets-Sheet 1

INVENTOR
Elmer J. Greenawalt

BY

ATTORNEYS

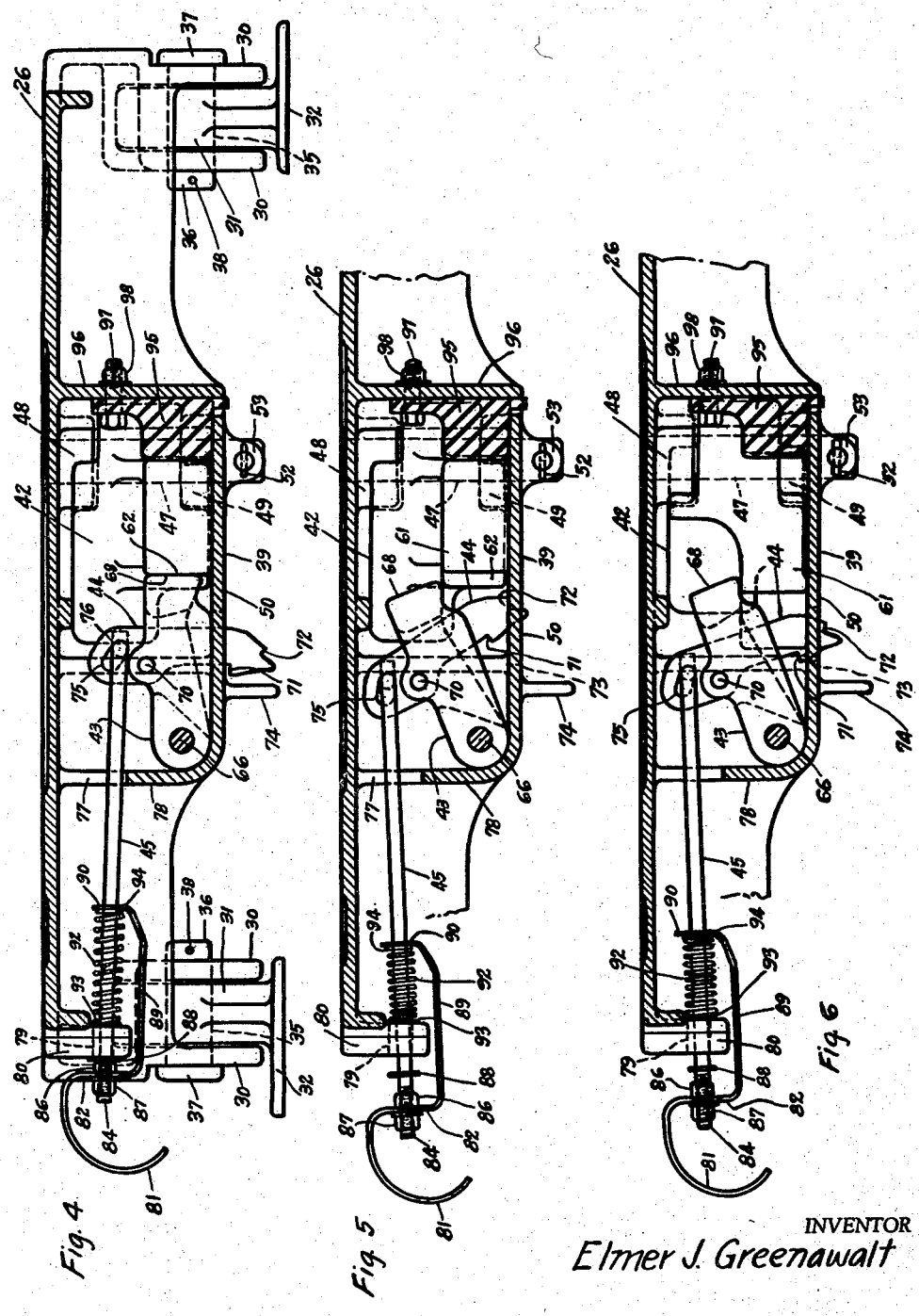

April 26, 1960 E. J. GREENAWALT 2,934,358
TRACTOR-TRAILER FIFTH WHEEL COUPLER
Filed Jan. 16, 1959 4 Sheets-Sheet 3
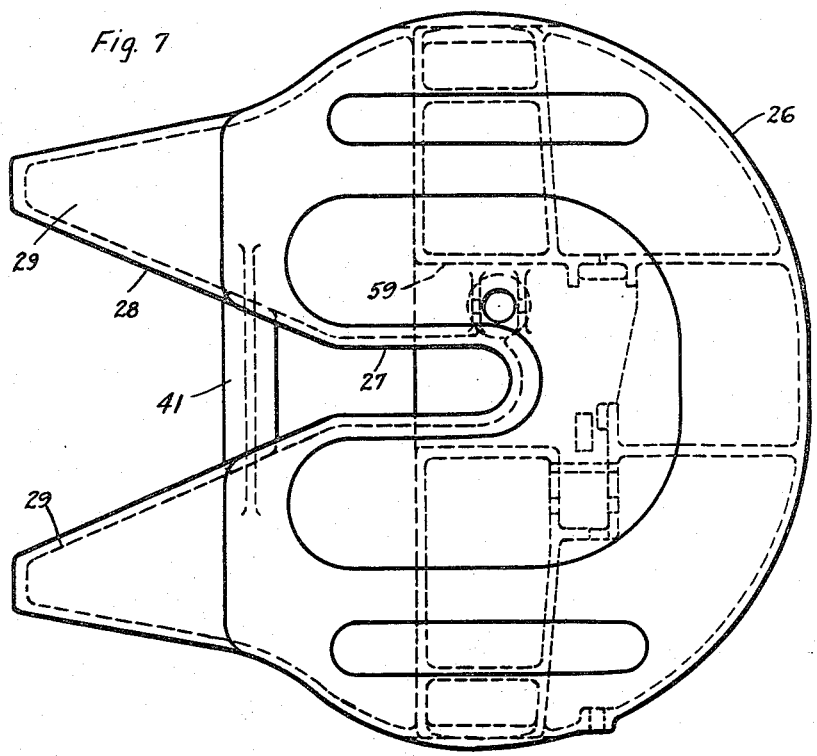
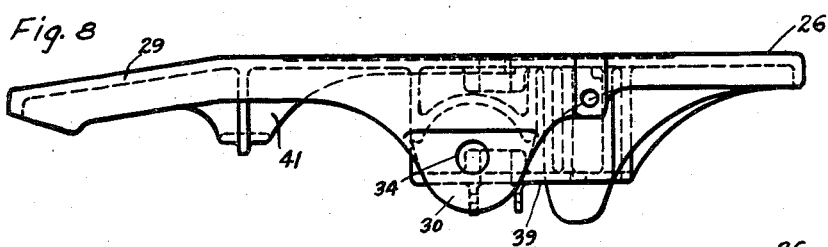
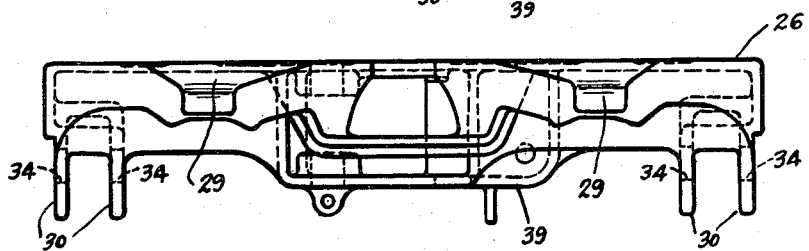
INVENTOR
Elmer J. Greenawalt

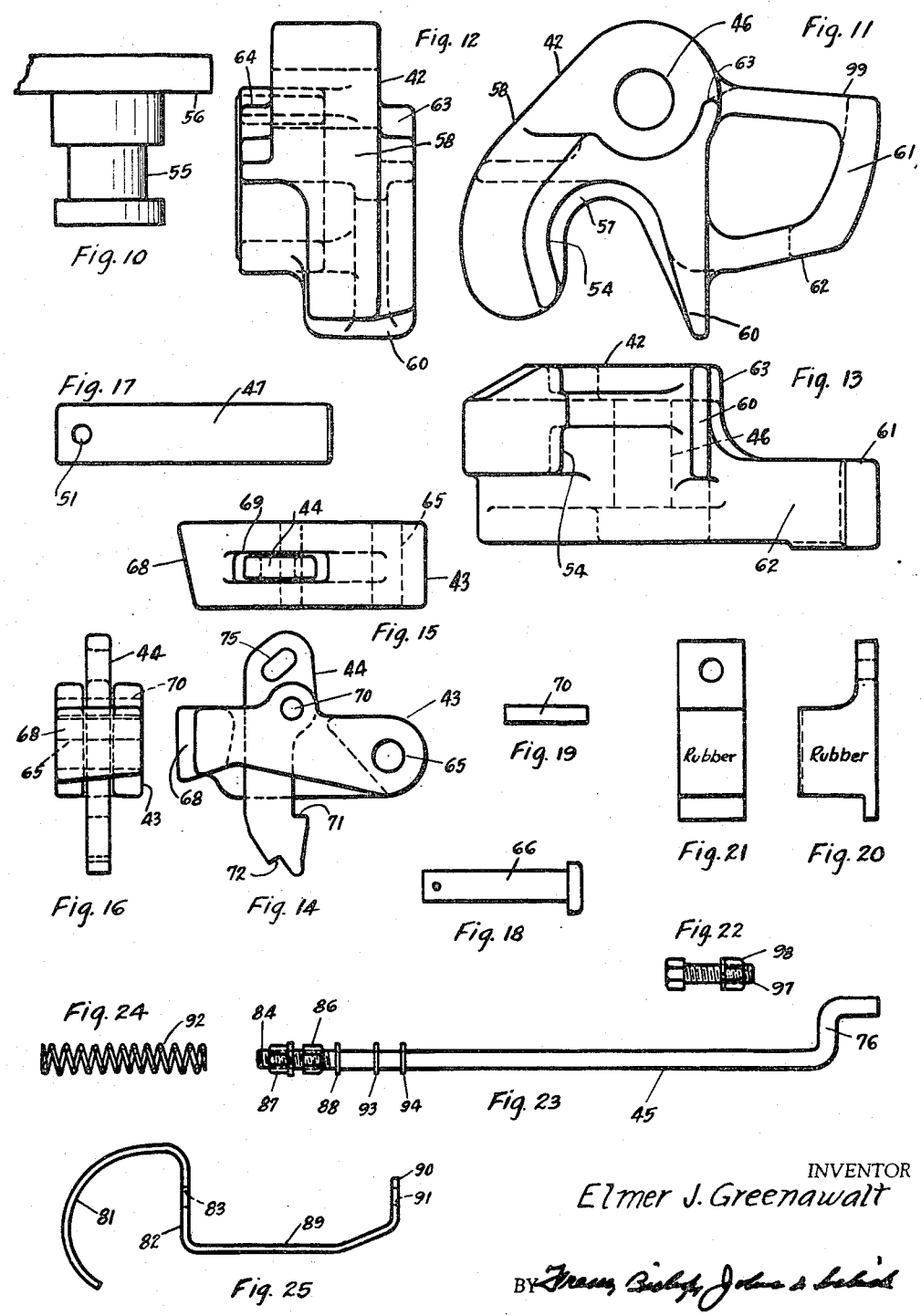

United States Patent Office 2,934,358
Patented Apr. 26, 1960

2,934,358

TRACTOR-TRAILER FIFTH WHEEL COUPLER

Elmer J. Greenawalt, Alliance, Ohio

Application January 16, 1959, Serial No. 787,181

9 Claims. (Cl. 280—434)

The invention relates to fifth wheels for tractor-trailer combinations, and more particularly to a novel coupler therefor.

Under present practice, coupling arrangements for tractor and trailer combinations include a fifth wheel assembly mounted on the tractor, and coupler mechanism and operating means therefor, a king pin being mounted upon the forward end of the trailer and arranged to interlock with the coupler mechanism.

When the tractor and trailer are in the coupled position, the fifth wheel assembly is beneath the trailer, making it necessary for the operator to stoop at least partly under the trailer in order to unlock the trailer from the tractor. This unlocking operation often requires the operator to apply considerable force in order to unlock the coupler mechanism.

It is an object of the invention to provide a tractor-trailer fifth wheel coupler which overcomes the above-mentioned difficulties and disadvantages.

Another object of the invention is to provide a simple, efficient and easily operated coupler for a tractor-trailer combination.

A further object of the invention is to provide a tractor-trailer fifth wheel coupler including a knuckle to receive the king pin, a lock and a latch therefor, and a latch bar extending through one side of the fifth wheel and having a conveniently located handle thereon for manual manipulation of the latch and lock.

The above and other objects, apparent from the drawings and following description, may be attained, the above described difficulties overcome and the advantages and results obtained, by the apparatus, construction, arrangement and combinations, sub-combinations and parts which comprise the present invention, a preferred embodiment of which, illustrative of the best mode in which applicant has contemplated applying the principle, being set forth in detail in the following description and illustrated in the accompanying drawings.

In general terms, the invention may be briefly described as comprising a tractor-trailer fifth wheel coupler including a fifth wheel upon the tractor, with a rearwardly disposed and flared slot therein to receive a king pin depending from the forward end of a trailer.

A housing is formed on the underside of the fifth wheel and a knuckle is pivoted within said housing and provided with a slot adapted to receive and hold the king pin. The knuckle is operated by a lock and latch assembly which is controlled by an operating rod extending outwardly at one side of the fifth wheel and provided with a conveniently located handle for manual manipulation by the operator.

With the operating parts of the fifth wheel in open position, the slot in the knuckle registers with the slot in the fifth wheel, so that when the tractor is backed toward the trailer, the king pin upon the trailer will be received therein and will move the knuckle to locked position, coupling the trailer to the tractor.

When the operating handle is manipulated, the lock and latch assembly are moved to the lock-set position, releasing the knuckle, so that as the tractor is pulled away from the trailer, the knuckle will be moved to the open position permitting the king pin to move out of the slots in the knuckle and fifth wheel. The parts are then in position for coupling the trailer to the tractor as above described.

A preferred embodiment of the invention is illustrated in the accompanying drawings, in which:

Fig. 4 is a transverse section taken on the line 4—4, Fig. 1, showing the parts in locked position;

Fig. 5 is a similar view showing the parts in lock-set position;

Fig. 6 is a similar view showing the parts in open position;

Fig. 7 is a top plan view of the fifth wheel per se with the working parts removed therefrom;

Fig. 8 is a side elevation of the fifth wheel shown in Fig. 7;

Fig. 9 is a front elevation of the fifth wheel shown in Figs. 7 and 8;

Fig. 10 is a side elevation of the king pin, showing a fragmentary portion of the forward end of the trailer upon which it is mounted;

Fig. 11 is a detached top plan view of the knuckle;

Fig. 12 is an elevation of one side of the knuckle;

Fig. 13 is a rear elevation of the knuckle looking into the slot therein;

Fig. 14 is a side elevation of the lock and latch assembly;

Fig. 15 is a top plan view of the lock and latch assembly;

Fig. 16 is an edge view of the lock and latch assembly;

Fig. 17 is a detached side elevation of the knuckle pin;

Fig. 18 is a detached side elevation of the lock pin;

Fig. 19 is a detached side elevation of the lock and latch pin;

Fig. 20 is a side elevation of the rubber bumper;

Fig. 21 is a front elevation of the rubber bumper;

Fig. 22 is a detached side elevation of the bolt and nut which secures the rubber bumper to the fifth wheel;

Fig. 23 is a detached side elevation of the latch and lock operating rod;

Fig. 24 is a detached side elevation of the operating rod spring; and

Fig. 25 is a detached side elevation of the operating rod handle.

Referring now more particularly to the embodiment of the invention illustrated, in which similar numerals refer to similar parts throughout, the fifth wheel is indicated generally at 26. The usual slot 27 is formed in the fifth wheel for receiving the king pin, as in conventional practice, and this slot is rearwardly flared as at 28, bifurcating the rear end of the fifth wheel, forming the spaced rearwardly disposed legs 29, which are downwardly and rearwardly inclined, as in usual practice, as best shown in Figs. 1 to 3 and 7 to 9.

Figure 2:
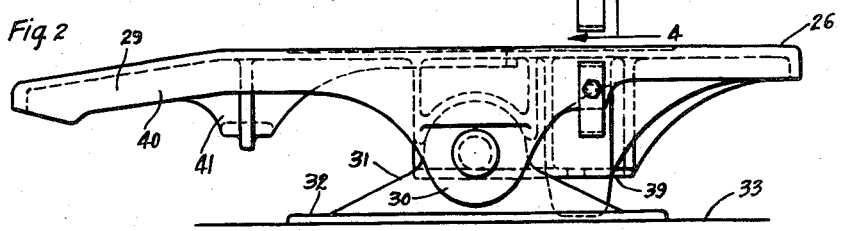
Fig. 2 is a side elevation of the fifth wheel shown in Fig. 1.
Figure 3:
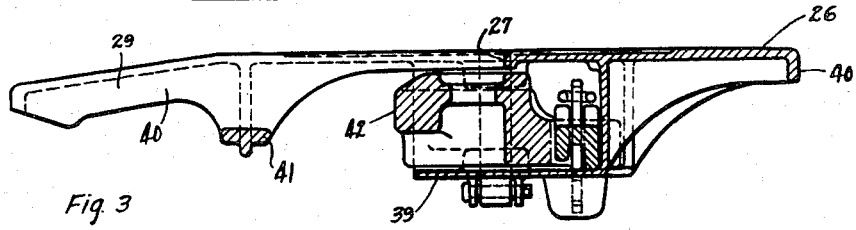
Fig. 3 is a section taken on the line 3—3, Fig. 1.

As in usual practice, spaced pairs of depending ears 30 are formed at each side of the fifth wheel 26 and receive therebetween the upright lugs 31 formed upon bracket plates 32 which are fixed upon the rear portion of the tractor frame as indicated at 33 in Fig. 2.

Apertures 34 are formed in the depending ears 30 of the fifth wheel, and similar apertures 35 in the upright lugs 31 register therewith to receive the pivot pins 36, each of which has a head 37 formed upon one end and a cotter pin or the like 38 located through a suitable diametrically disposed aperture in the other end thereof, whereby the fifth wheel is mounted for horizontal tilting movement upon the trailer as in usual and well known practice.

A housing, indicated generally at 39, is formed upon the underside of the fifth wheel, the operating parts being mounted therein as will be later described in detail.

For the purpose of strengthening and reinforcing the fifth wheel, a depending marginal flange 40 is formed thereon extending around the entire circumference thereof and around the outlines of the rearwardly disposed legs 29.

For the purpose of reinforcing the legs 29 of the fifth wheel, a downwardly arched rib 41 connects the same and is so located that the king pin upon the trailer will pass above the top of the same as the trailer is coupled to and uncoupled from the tractor.

The operating parts of the fifth wheel include the knuckle, indicated generally at 42, the lock and latch assembly comprising the lock indicated generally at 43, the latch indicated generally at 44, and the operating rod indicated generally at 45.

The knuckle 42 is provided with a vertical aperture 46 which receives the knuckle pin 47 by means of which the knuckle is pivotally mounted within the housing 39 of the fifth wheel. This knuckle pin is located through suitable apertures in the depending boss 48 on the underside of the fifth wheel 26 and the upright boss 49 on the top of the bottom wall 50 of the fifth wheel housing 39.

The lower end of the knuckle pin extends through the bottom wall of the housing and has an aperture 51 therein which receives the cotter pin 52 for connecting the knuckle pin to the depending lug 53 on the bottom of the housing 39.

A slot 54 is provided in the knuckle 42 to receive the king pin 55, which in usual manner, depends from the forward end 56 of the trailer, a fragmentary portion of which is shown in Fig. 10. A king pin retaining lug or rib 57 is formed within the slot 54 of the knuckle to retain the king pin in the knuckle.

The knuckle stop face 58 is adapted to contact the stop plate 59 within the housing to hold the knuckle in the open or coupling position. At the inner side of the slot 54 in the knuckle, the gathering wing 60 is provided for contact with the king pin upon the trailer in the coupling operation.

Figure 1:
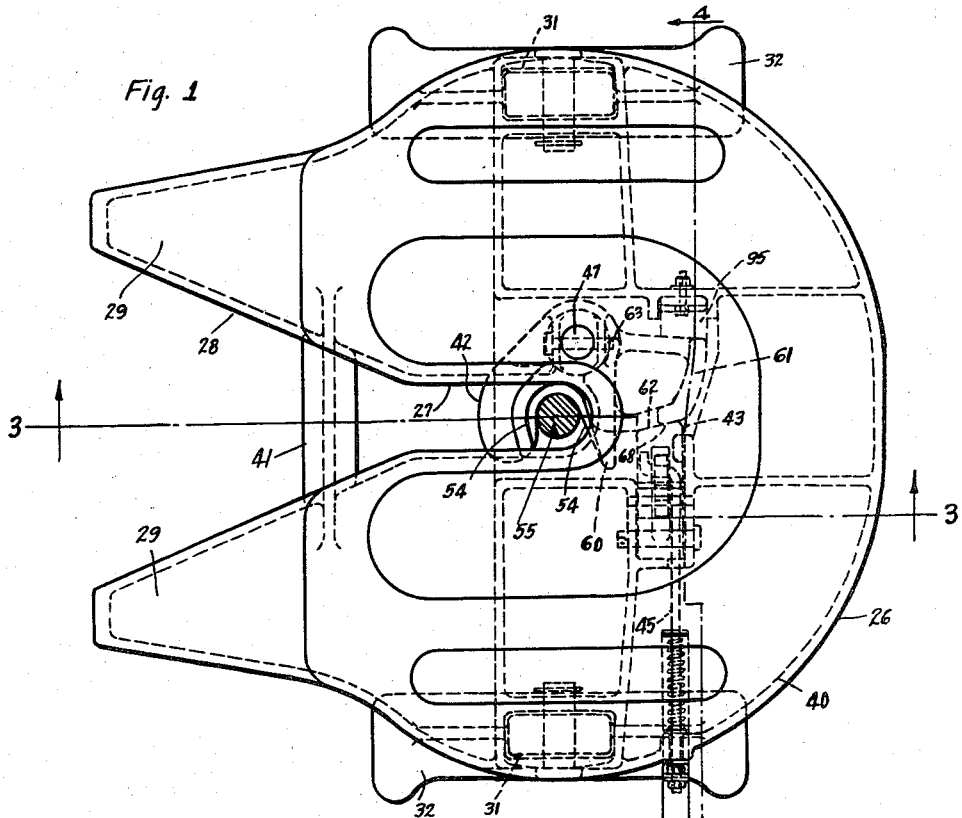
Fig. 1 is a top plan view of the fifth wheel and associated parts thereof, showing the same in the locked position.

A tail 61 is formed upon the knuckle, and in the open position of the parts, the lock rests upon the knuckle tail as will be later described, and as best shown in Fig. 6. A locking face 62 is formed upon the tail of the knuckle for contact with the end of the lock in the locked position, as will be later explained, and as best shown in Figs. 1 and 4.

Boss bearings 63 and 64 are formed upon the top and bottom respectively of the knuckle and serve as a pin protection. These boss bearings work around the top and bottom bosses 48 and 49 respectively within the housing 39 of the fifth wheel for the purpose of giving more protection to the knuckle pin 47, and for absorbing some of the stress in pulling.

The lock 43 is provided near one end with the aperture 65 which receives the lock pin 66, by means of which the lock is pivotally mounted within the fifth wheel housing 39. The free end of the lock 43 is provided with the locking face 68 for contact with the locking face 62 of the knuckle when the parts are in locked position, as best shown in Fig. 4.

A longitudinally disposed, vertical slot 69 is formed in the lock 43, and the latch 44 is located therethrough and pivotally mounted upon the lock as by the latch pin 70. An anti-creep ledge 71 is formed upon the outer edge of the latch 44, near the lower end thereof, and a lock-set ledge 72 is formed at the lower end of the latch on the opposite edge thereof. The latch 44 is located through a slot 73 in the bottom wall 50 of the fifth wheel housing 39.

A safety lug 74 depends from the bottom wall 50 of the fifth wheel housing 39, for the purpose of preventing accidental contact with the lower end of the latch. An inclined slot 75 is formed in the upper end of the latch 44 and receives the angular offset end portion 76 of the operating rod 45. This operating rod extends through a slot 77 in one side wall 78 of the fifth wheel housing 39 and through a slot 79 in the depending lug 80 on the adjacent side of the fifth wheel.

The operating handle 81 has the vertically disposed portion 82 provided with an aperture 83, through which the threaded outer end 84 of the operating rod 45 is located. Nuts 86 and 87 are threaded upon the tapped end portion 84 of the operating rod and located against opposite sides of the vertical portion 82 of the operating handle, to connect the handle rigidly to the operating rod.

A washer 88 is located upon the operating rod 45 between the nut 86 and the depending lug 80. A substantially horizontal portion 89 of the operating handle extends inwardly from the vertical portion 82 thereof and terminates in the upturned end 90 having an aperture 91 therein, through which the operating rod 45 is located.

A coil spring 92 is interposed between the upturned portion 90 of the operating handle and the depending lug 80 of the fifth wheel, washers 93 and 94 being mounted upon the operating handle at the outer and inner ends respectively of said spring.

A rubber bumper 95 is attached to one side wall 96 of the fifth wheel housing 39, as by the bolt 97 and nut 98, for contact with the surface 99 upon the tail of the knuckle, absorbing shock and back-lash of the knuckle when the parts are in the locked position as shown in Figs. 1 and 4.

In the operation of the improved tractor-trailer fifth wheel coupler, with the parts in the locked position, as shown in Figs. 1 and 4, the king pin 55 of the trailer is located within the slot 54 of the knuckle and the knuckle is held in locked position, in contact with the rubber bumper 95, by means of the lock 43, the locking face 68 of which is held in contact with the locking face 62 of the knuckle tail by means of the latch 44.

The latch is maintained in the locked position by means of the spring 92 upon the operating rod 55, so that the anti-creep ledge 71 thereof engages the underside of the bottom wall 50 of the fifth wheel housing 39, adjacent to the slot 73 in said bottom wall. It will be seen that the angular offset end portion 76 of the operating rod is held in the lower end of the inclined slot 75 in the latch.

When it is desired to uncouple the trailer, the operator pulls outward upon the operating handle 81, swinging the lock and latch assembly to the lock-set position best shown in Fig. 5, raising the locking face 68 of the lock above the tail 61 of the knuckle, thus unlocking the knuckle.

It is pointed out that in order for the pivoted lock 43 to be able to move out of the locked position of Fig. 4, it must push the tail portion 61 of the knuckle toward the right of said figure, and the knuckle is permitted to move and release the lock by virtue of the yielding action of the rubber bumper 95.

The lock and latch assembly are held in the lock-set position shown in Fig. 5 by engagement of the lock-set ledge 72 of the latch 44 with the top surface of the bottom wall 50 of the fifth wheel housing 39. The operator may then move the tractor forward, away from the trailer, permitting the king pin 55 carried by the trailer to swing the knuckle to the open position best shown in Fig. 6, in which the free end of the lock 43 rests upon the top of the tail 61 of the knuckle.

With the parts in this position, the trailer may be again coupled to the tractor by backing the trailer toward the tractor so that the king pin 55 of the trailer is received in the slot 27 of the fifth wheel and in the slot 54 of the knuckle, and as the trailer continues to move backward the king pin 55, engaging the gathering wing 60 of the knuckle, will throw the knuckle to the locked position shown in Figs. 1 and 4, permitting the lock 43 to drop into the locked position, with the locking face 68 thereof engaging the locking face 62 upon the tail of the knuckle, and forcing the tail of the knuckle against the rubber bumper 95.

At this time, the latch 44 drops into the position shown in Fig. 4, with the anti-creep ledge 71 thereof engaged under the bottom wall 50 of the fifth wheel housing 39, holding the parts in locked position so that the tractor and trailer may be driven away as a combination.

From the above it will be seen that a simple, efficient and conveniently operated tractor-trailer fifth wheel coupler is provided which holds the parts in locked position until the operating handle 81 is pulled to move the parts to the lock-set position, which permits the tractor to drive away from the trailer, the king pin of the trailer throwing the knuckle to the open position.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. In a fifth wheel coupler for tractor-trailer vehicles, the combination of a fifth wheel upon the tractor for cooperation with a king pin upon the trailer, a knuckle pivoted upon the fifth wheel and having a locking face and a slot for receiving the king pin, a lock pivoted upon the fifth wheel and having a locking face for contact with the locking face of the knuckle when in locked position, a latch pivoted upon the lock for normally holding the lock and knuckle in locked position, an operating rod for unlatching the latch and moving the lock to release the knuckle whereby the king pin may be withdrawn from the fifth wheel, there being an inclined slot in the latch, an angular offset end upon the operating rod located in said slot, and means for normally holding said angular offset end of the operating rod in the lower end of the slot in the latch.

2. In a fifth wheel coupler for tractor-trailer vehicles, the combination of a fifth wheel upon the tractor for cooperation with a king pin upon the trailer, a knuckle pivoted upon the fifth wheel and having a locking face and a slot for receiving the king pin, a lock pivoted upon the fifth wheel and having a locking face for contact with the locking face of the knuckle when in locked position, a latch pivoted upon the lock for normally holding the lock and knuckle in locked position, an operating rod for unlatching the latch and moving the lock to release the knuckle whereby the king pin may be withdrawn from the fifth wheel, there being an inclined slot in the latch, an angular offset end upon the operating rod located in said slot, and spring means for normally holding said angular offset end of the operating rod in the lower end of the slot in the latch.

3. In a fifth wheel coupler for tractor-trailer vehicles, the combination of a fifth wheel upon the tractor for cooperation with a king pin upon the trailer, a knuckle pivoted upon the fifth wheel and having a locking face and a slot for receiving the king pin, a lock pivoted upon the fifth wheel and having a locking face for contact with the locking face of the knuckle when in locked position, a latch pivoted upon the lock for normally holding the lock and knuckle in locked position, a housing upon the fifth wheel within which the knuckle, lock and latch are located, bosses on the top and bottom of the housing and boss-bearing lugs upon the knuckle and engaging around said bosses for protecting the knuckle pivot and absorbing some of the pulling strain.

4. In a fifth wheel coupler for tractor-trailer vehicles, the combination of a fifth wheel upon the tractor for cooperation with a king pin upon the trailer, a knuckle pivoted upon the fifth wheel and having a locking face and a slot for receiving the king pin, a lock pivoted upon the fifth wheel and having a locking face for contact with the locking face of the knuckle when in locked position, a latch pivoted upon the lock for normally holding the lock and knuckle in locked position, a housing upon the fifth wheel within which the knuckle, lock and latch are located, there being a slot in the lower wall of the housing, the lower end of the latch being located through said slot and having an anti-creep ledge for engagement with the underside of said lower wall when the parts are in the locked position, and a lug depending from said lower wall below the lower end of the latch for protecting the latch from accidental contact.

5. In a fifth wheel coupler for tractor-trailer vehicles, the combination of a fifth wheel upon the tractor for cooperation with a king pin upon the trailer, a knuckle pivoted upon the fifth wheel and having a locking face and a slot for receiving the king pin, a lock pivoted upon the fifth wheel and having a locking face for contact with the locking face of the knuckle when in locked position, a latch pivoted upon the lock for normally holding the lock and knuckle in locked position, a tail on the knuckle, the locking face being located on one side of said tail, and a rubber bumper on the fifth wheel for contact with the other side of said tail in the locked position.

6. In a fifth wheel coupler for tractor-trailer vehicles, the combination of a fifth wheel upon the tractor for cooperation with a king pin upon the trailer, a knuckle pivoted upon the fifth wheel and having a locking face and a slot for receiving the king pin, a lock pivoted upon the fifth wheel and having a locking face for contact with the locking face of the knuckle when in locked position, there being a slot in the lock, a latch located through and pivoted within said slot in the lock for normally holding the lock and knuckle in locked position, an operating rod for unlatching the latch and moving the lock to release the knuckle whereby the king pin may be withdrawn from the fifth wheel, there being an inclined slot in the latch, an angular offset end upon the operating rod located in said slot, and means for normally holding said angular offset end of the operating rod in the lower end of the slot in the latch.

7. In a fifth wheel coupler for tractor-trailer vehicles, the combination of a fifth wheel upon the tractor for cooperation with a king pin upon the trailer, a knuckle pivoted upon the fifth wheel and having a locking face and a slot for receiving the king pin, a gathering wing at one side of the slot in the knuckle for contact by the king pin during the coupling operation, a lock pivoted upon the fifth wheel and having a locking face for contact with the locking face of the knuckle when in locked position, a latch pivoted upon the lock for normally holding the lock and knuckle in locked position, an operating rod for unlatching the latch and moving the lock to release the knuckle whereby the king pin may be withdrawn from the fifth wheel, there being an inclined slot in the latch, an angular offset end upon the operating rod located in said slot, and means for normally holding said angular offset end of the operating rod in the lower end of the slot in the latch.

8. In a fifth wheel coupler for tractor-trailer vehicles, the combination of a fifth wheel upon the tractor for cooperation with a king pin upon the trailer, a knuckle pivoted upon the fifth wheel and having a locking face and a slot for receiving the king pin, a housing upon the fifth wheel within which the knuckle is located, a lock pivoted upon a horizontal pivot within the housing and having a locking face for contact with the locking face of the knuckle when in locked position, there being a vertically disposed slot through the lock, a latch located through the slot in the lock and pivoted therein for holding the lock and knuckle in locked position, there being a slot in the lower wall of the housing, the lower end of the latch being located through said slot in the housing, and an anti-creep ledge on said lower end of the latch for engagement with the underside of said lower wall when the parts are in locked position.

9. In a fifth wheel coupler for tractor-trailer vehicles, the combination of a fifth wheel upon the tractor for cooperation with a king pin upon the trailer, a knuckle pivoted upon the fifth wheel and having a locking face and a slot for receiving the king pin, a housing upon the fifth wheel within which the knuckle is located, a lock pivoted upon a horizontal pivot within the housing and having a locking face for contact with the locking face of the knuckle when in locked position, there being a vertically disposed slot through the lock, a latch located through the slot in the lock and pivoted therein for holding the lock and knuckle in locked position, there being a slot in the lower wall of the housing, the lower end of the latch being located through said slot in the housing, and a lock-set ledge on the lower end of the latch for engagement with the upper side of said lower wall when the parts are in the lock-set position.

References Cited in the file of this patent

UNITED STATES PATENTS

| | | |
|---|---|---|
| 2,140,990 | Emrick | Dec. 20, 1938 |
| 2,423,743 | Walther | July 8, 1947 |
| 2,833,558 | Fenster | May 6, 1958 |

FOREIGN PATENTS

| | | |
|---|---|---|
| 556,823 | Great Britain | Oct. 22, 1943 |